May 16, 1950          E. B. NOLT          2,507,540

HAY GATHERING AND FEEDING MECHANISM FOR HAY BALERS

Filed March 9, 1944          7 Sheets-Sheet 1

INVENTOR.
Edwin B. Nolt,
BY
John B. Brady
ATTORNEY

May 16, 1950 E. B. NOLT 2,507,540
HAY GATHERING AND FEEDING MECHANISM FOR HAY BALERS
Filed March 9, 1944 7 Sheets-Sheet 2

INVENTOR.
Edwin B. Nolt,
BY
John C. Brady
ATTORNEY

May 16, 1950 E. B. NOLT 2,507,540
HAY GATHERING AND FEEDING MECHANISM FOR HAY BALERS
Filed March 9, 1944 7 Sheets-Sheet 4

INVENTOR.
Edwin B. Nolt,
BY
John B. Brady
ATTORNEY

May 16, 1950 E. B. NOLT 2,507,540
HAY GATHERING AND FEEDING MECHANISM FOR HAY BALERS
Filed March 9, 1944 7 Sheets-Sheet 5

INVENTOR.
Edwin B. Nolt,
BY
John B. Brady
ATTORNEY

Patented May 16, 1950

2,507,540

UNITED STATES PATENT OFFICE 2,507,540

HAY GATHERING AND FEEDING MECHANISM FOR HAY BALERS

Edwin B. Nolt, Ephrata, Pa., assignor, by mesne assignments, to The Sperry Corporation, New York, N. Y., a corporation of Delaware Application March 9, 1944, Serial No. 525,787

8 Claims. (Cl. 56—364)

My invention relates broadly to harvesting machines and more particularly to an improved hay gathering and feeding attachment for balers.

One of the objects of my invention is to provide an improved construction of hay gathering and feeding attachment for balers which may be readily elevated from gathering position to traction position, allowing the hay baler to be readily moved to the desired location for gathering and feeding hay from the "windrow" on the field to the baler.

Another object of my invention is to provide a construction of hay gathering and feeding attachment for balers in which the hay gatherer may be readily elevated from gathering position under spring lift action and latched in elevated position while allowing movement of the harvester with the gatherer attached to various locations.

Still another object of my invention is to provide an arrangement of driving mechanism for simultaneously operating a hay gatherer mechanism with a hay feeding mechanism for delivering the hay to a baler.

A further object of my invention is to provide an arrangement of hay feeding mechanism interposed between a hay gatherer and a baling mechanism for positively feeding hay from the gatherer to the hay baling mechanism.

Another object of the invention is to provide a hay baler having pick-up means for delivering the hay over the front of the baler.

A still further object of my invention is to provide a novel construction of hay feeding mechanism for a baler employing a plurality of positively driven hay engaging means for progressively advancing the hay from the gatherer to the baling mechanism.

Other and further objects of my invention reside in the details of construction of the hay gathering and feeding mechanism for balers as set forth more fully in the specification hereinafter following by reference to the accompanying drawings, in which:

Figure 1 is a side elevational view of a baler showing the application of the gathering and feeding mechanism of my invention thereto.

Referring to the drawings in detail, reference character 1 designates the chassis of a harvester mounted upon a wheeled support represented at 2 about which the parts of the harvester are normally balanced. A pull or draw bar 3 extends from the chassis to provide a connection 4 to a tractor or other propelling means for drawing the harvester to the desired location and thereafter for propelling the harvester along the windrow through the field in gathering, packing and baling the hay. The chassis carries the baler mechanism which I have indicated generally at 5, including hydraulic mechanism indicated generally at 6 for controlling the operation of the hay compressing and wad mechanism which I have set forth more clearly in my copending application Serial No. 533,415 filed April 29, 1944, which has matured into Patent No. 2,396,720. The main valve for the hydraulic system is indicated at 120 connected with the link 121 which operates the valve plunger 122 from the bell crank mechanism 123 for controlling the operation of the ram. The associated parts of the hydraulic mechanism, including the fluid supply system leading from the tank 42 are not claimed herein as part of the instant invention, and reference is made to my application 533,415 supra for a detailed description thereof. The hydraulically controlled bale compressing mechanism is indicated adjacent the rear of the frame of the baler shown at 7. The wad board for packing the hay has been shown generally at 8 actuated by pivotally mounted means 9 pivotally mounted at 10 and 11, all of which is more fully described in my aforesaid pending application. I have illustrated herein only those portions of the harvesting machine which require explanation for the purpose of understanding the coordination of the gathering and hay feeding mechanism which is the subject of my invention herein.

The gathering mechanism is mounted on a frame structure comprising pivoted side bars 12 pivoted at 14 to the chassis of the harvester represented at 1. The side bars 12 provide journals adjacent opposite ends thereof at 15 for the rotary gatherer represented at 16. The rotary gatherer 16 includes a multiplicity of frame members 17 extending from the central tubular sleeve-like member 18 to the end plates 19. The end plates 19 are interconnected adjacent their extremities by tie bars 20 which carry the hay gathering fingers 21. Each of the hay gathering fingers 21 are provided with a series arranged coil spring 22 which imparts sufficient yieldability to the hay gathering fingers while insuring adequate rigidity thereof to perform cyclic hay gathering operations as the fingers repeatedly come into engagement with the mown hay in the windrow as the harvester moves along the field in performing the gathering, feeding and baling operation.

Figure 4:
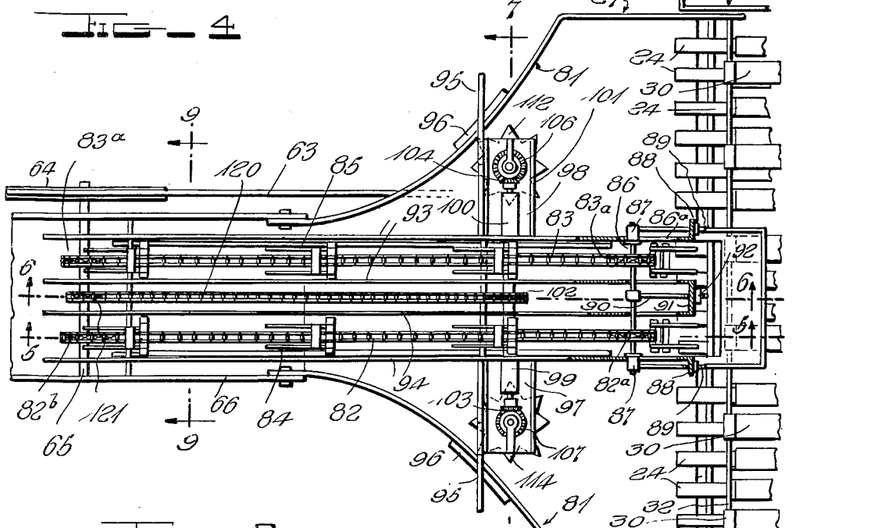
Fig. 4 is a top plan view of the hay feeding mechanism disposed between the hay gatherer and the baling mechanism.

The gathering fingers 21 are arranged in pairs interconnected by a bridge portion fastened at 23 to the tie bars 20 in spaced arrangement. The gathering fingers project between the curved strips 24 which are pivotally supported at opposite ends as represented at 25 and 26 with respect to the movable frame of the gatherer and the trough-like guide 27 of the harvester. The side bars 12 which are pivoted to the chassis of the harvester at 14 provide a supporting frame for the extended side bars 28 which serve as supports for the side plates 29 of the trough-like guide which directs the hay into the feeding mechanism of the harvester. The members 28 provide supporting means for the curved strip-like members 30 which are pivotally mounted on opposite ends as represented by rod-like member 31 extending transversely on the ends of the members 28 and by rod-like member 32 extending transversely of the trough-like member 27 between side frames 29. The strips 30, while spaced apart as represented in Fig. 4 serve as a confining means for the hay as it progresses upwardly under control of the gathering fingers 21 intermediate the space between strip-like members 24 and strip-like members 30. It will be seen that the arrangement of the gathering fingers 21 is such that as the hay is picked up and moved through the confining space intermediate strip-like members 24 and 30, the fingers 21 gradually release the hay by moving rotatably with respect to the curvature of the strip-like members 24.

It will be observed that side bars 12 and the extending members 28 form a frame structure which may be bodily elevated with respect to the ground when moving the machine to the field. Bar members 12 provide mounting means for angularly extending bracket members 33 providing journaling means for the wheels 34 of the wheeled support for the gatherer which normally serve to support the gatherer when the gatherer is in lowered position, and in use during the harvesting operation. The bar members 12 also serve as supporting means for bracket members 35 which depend from bar members 12 and serve as supports for stub shafts indicated at 36 and 37 at opposite sides of the gatherer. Stub shaft 36 provides a pivoting means about which link 38 is pivoted while stub shaft 37 provides means about which the link 39 is pivoted. Link 38 is connected through a spring 40 to the extremity of a suitable bracket 41 that projects vertically from the chassis of the baler adjacent the hydraulic tank represented at 42. The link 39 has a dual connection thereto through coil springs 43 and 44 which connect to the upper extremity of bracket 45 secured to the opposite side of the chassis of the gatherer. The action of the coil springs is such that these springs serve as a counterbalance and lift when an operator on each side of the machine grasps the frame of the gatherer and by conjoint effort raises the gatherer from ground level. The coil springs aid in effecting the lifting operation to a height in which the latch bar 46 may be shifted from the notch 47 (Fig. 3) to notch 48 (Fig. 1) where the notches successively engage over the pin 49 carried by bracket 50 extending from the chassis of the baler. When it is desired to again lower the gatherer, the latch bar 46 is grasped and moved slightly about pivot 51 thereof on bar members for disengaging the notch 47 from pin 49, allowing the gatherer to be restored to ground engaging position. During this operation the curved strip-like members 24 and 30 undergo a displacement and deformation operation. That is, the strip-like members 24 pivot about centers 25 and 26 while strip-like members 30 pivot about pivot points 31 and 32 allowing the strip-like members to slightly bend therebetween. During this elevating and lowering operation the side plates 29 forming the guide for the hay gatherer are free to shift longitudinally with respect to the side frames 27 of the hay feeder in overlapping relation. Suitable bracing means are provided between the side frames 29 and the shiftable frame of the gatherer as represented by angle members 52 and 53.

Figure 2:
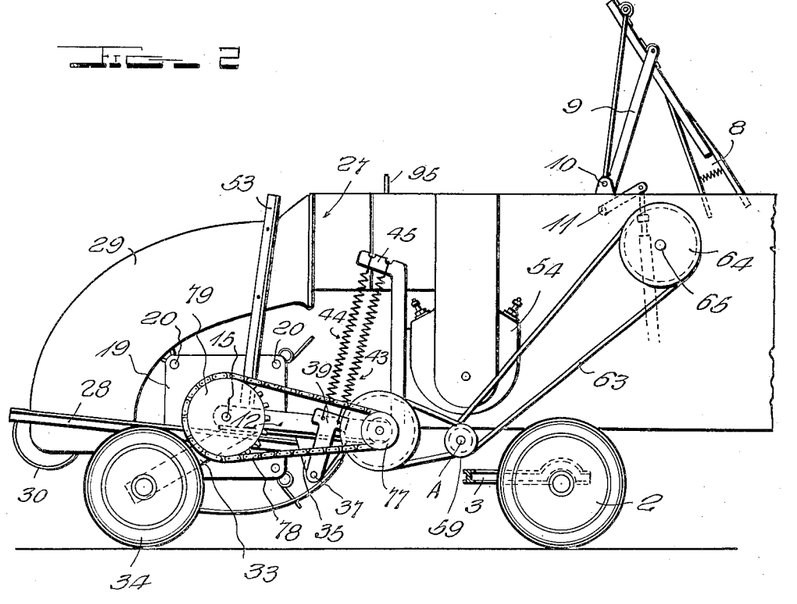
Fig. 2 is an enlarged fragmentary side elevational view of the gatherer and feeding mechanism attached to the baler and in position for gathering and feeding hay from the windrow in the field.
Figure 3:
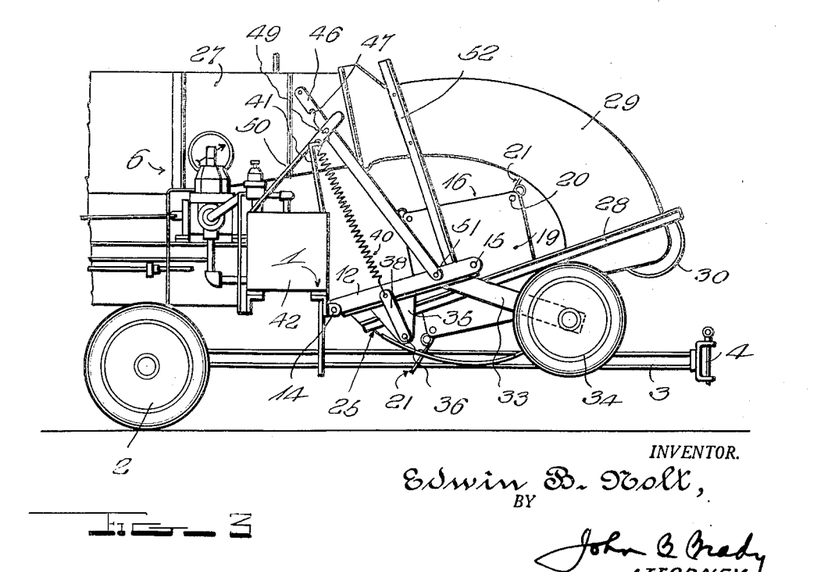
Fig. 3 is an elevational view showing the gatherer and feeder latched in elevated position so that the baler is free to be shifted to selected locations in the field preparatory to a gathering, feeding and baling operation.

The distribution of mass in the gatherer structure is such that the hinge section is so balanced that the springs 40, 43 and 44 with the assistance of the lifting effort of the operator at the end of the lever-like frame structure is adequate to shift the gatherer from a position as illustrated in Fig. 2 to the position illustrated in Fig. 3. The drive for the rotary gatherer is taken from the main drive on the baler indicated generally by shaft A driven from the engine indicated generally at 54. The drive is represented more clearly in Fig. 16 in which the engine 54 drives shaft 55 which is connected through sprocket chain 56 extending between sprocket wheels 57 and 58 where sprocket wheel 58 is mounted on shaft A. Shaft A drives the belt pulley 59 and sprocket wheels 60, 61 and 58. The belt pulley 59 engages the V-belt 63 which drives the larger pulley 64 mounted on shaft 65 journaled in the trough-like frame structure 66 of the hay feeder illustrated in Fig. 9. The V-belt 63 which interconnects pulleys 59 and 64 is subject to slippage to prevent continuous driving action of the feeder against possible obstructions which may occur in the hay feeding operation for avoiding injury to the mechanism as will be hereinafter described in more detail. The sprocket wheel 61 carried by shaft A drives chain 67 that engages sprocket wheel 68 carried by intermediate shaft B. Intermediate shaft B carries sprocket wheel 69 which drives sprocket chain 70 engaging sprocket wheel 71 on shaft C for operating the tying mechanism of the baler. The required proportionate speeds are obtained by selection of size of the several sprocket wheels employed in the drive system. The drive means for the gatherer is controlled through chain 72 engaged over sprocket wheel 60 on shaft A and over sprocket wheel 73 on shaft 74. Chain 72 engages sprocket wheel 75 on shaft 76 which also carries sprocket wheel 77. By this arrangement a reversal in the direction of rotation is secured at shaft 76 as compared to the direction of rotation of shaft A. Sprocket wheel 77 drives chain 78 shown more clearly in Fig. 2 which engages over sprocket wheel 79 which drives shaft 15 of the gatherer. As heretofore explained shaft 15 serves to revolve the frame of the rotary gatherer consisting of the space plates 19 heretofore explained and the gathering fingers 21 which serve to move the hay through the channel intermediate the strip-like members 24 and 30.

Figure 16:
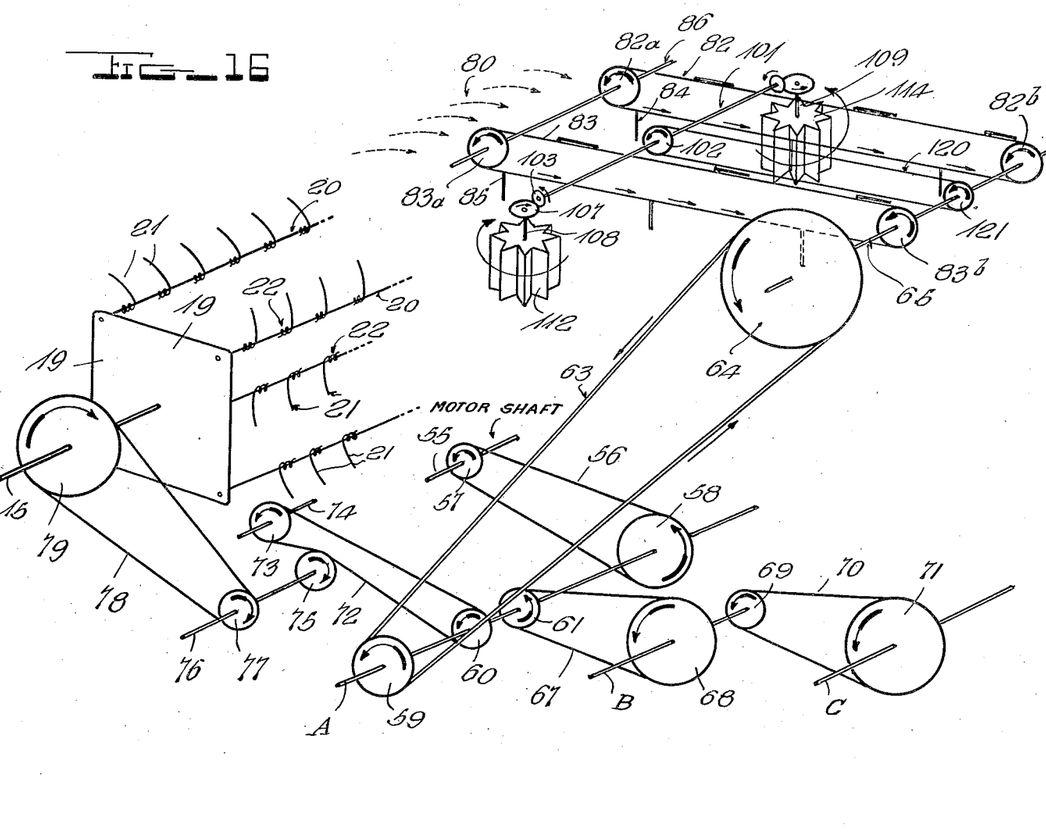
Fig. 16 is a perspective view showing the coordination of the driving means for the gatherer and the hay feeding means.

The hay is delivered by the gatherer in the general direction indicated by arrows 80 in Fig. 16 at the throat of the trough-like feeder constituted by side frames 27 which taper as represented by walls 81 into the trough-like structure 66 through which the hay is moved to the baling chamber. The hay feeder is shown schematically in Fig. 16 as comprising a pair of sprocket chains 82 and 83, each of which carry hay feeding finger-like members represented at 84 and 85 whose function is to advance the masses of hay delivered from the gatherer to the baling chamber of the baler. The sprocket chains 82 and 83 are driven by sprocket wheels represented at 82a and 83a carried by transversely extending shaft 86 and sprocket wheels 82b and 83b carried by shaft 65 in alignment with the sprocket wheels 82a and 83a on shaft 86. Shaft 65 as heretofore explained is journaled with respect to the side walls of the trough-like structure 66. Shaft 86 is journaled in bearings 87 which are adjustably supported with respect to frame members 88 extending from the chassis of the baler. It will be observed that the bearings 87 may be longitudinally adjusted by tightening the threaded nut and bolt connections 89 with respect to frame members 88 for thereby eliminating any tendency of the sprocket chain 82 and 83 to sag. The shaft 86 may be symmetrically adjusted in position by means of adjusting member 90 which extends through frame structure 91 and is provided with a threaded bolt and nut connection 92 allowing proper spacial relation between shafts 86 and 65 to be selected. The sprocket chains 82 and 83 operate in long channels through the trough-like feeder 66, each within protective housings provided by longitudinally extending plate members shown at 93 and 94. Plate members 93 and 94 are supported from the chassis of the baler through the intermediary of the transversely extending supporting means 95 which engages over opposite sides of the side frames of the trough-like guide at the tapered portions 81 thereof. Suitable reinforcement for the sides of the trough-like structure is provided with reinforcing means 96 to carry the weight resulting from the suspension of the chain-like feeders centrally of the trough-like structure. The transverse shafts 65 and 86 pass through the sets of plates as shown. The plates are suitably slotted as represented at 86a to provide for the longitudinal adjustment of the tension on the sprocket chains as heretofore explained.

Figure 8:
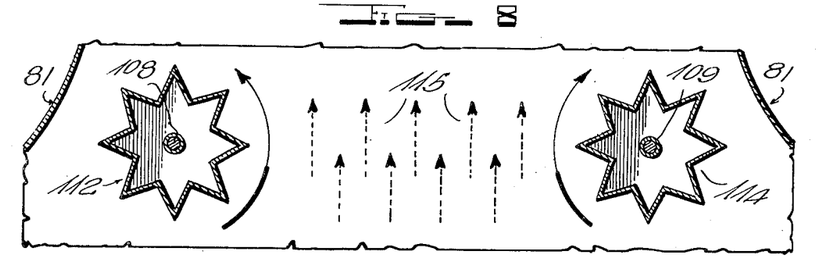
Fig. 8 is a fragmentary horizontal sectional view taken substantially on line 8—8 of Fig. 7.

The supporting means 95 serve to suspend the two castings shown at 97 and 98 in positions on opposite sides of the feeding means heretofore explained. Each of the castings 97 and 98 include bearing portions 99 and 100 which serve as bearings for the transversely extending shaft 101 to which is secured centrally thereof the sprocket wheel 102 between the inner surfaces of the inner longitudinally extending plates 93 and 94. The shaft 101 carries bevel gears 103 and 104 on opposite ends thereof which mesh with bevel gears 106 and 107 mounted on vertically extending shafts 108 and 109 respectively. The castings 97 and 98 include bearing portions 110 and 111 serving as journaling means for the vertically extending shafts 108 and 109. The shelf-like members 97a and 98a extend immediately beneath the castings 97 and 98 respectively and serve as guide means for directing the hay which is advanced beneath the conveyors in the direction of the arrows 115 (Fig. 8) by means of the rotary feed wheels shown at 112 and 114. The said wheels 112 and 114 are each of star-like transverse section and rotate inwardly toward each other within the tapered portion 81 of the trough-like structure which guides the hay from the gatherer to the baling chamber. The feed wheels turn in opposite directions, that is, feed wheel 112 turns counterclockwise while feed wheel 114 turns clockwise, moving the hay inwardly to a central position within the trough-like structure to be engaged by the depending fingers 84 and 85 propelled by chains 82 and 83 respectively for moving the hay toward the baling chamber.

Figures 12, 13, 15:
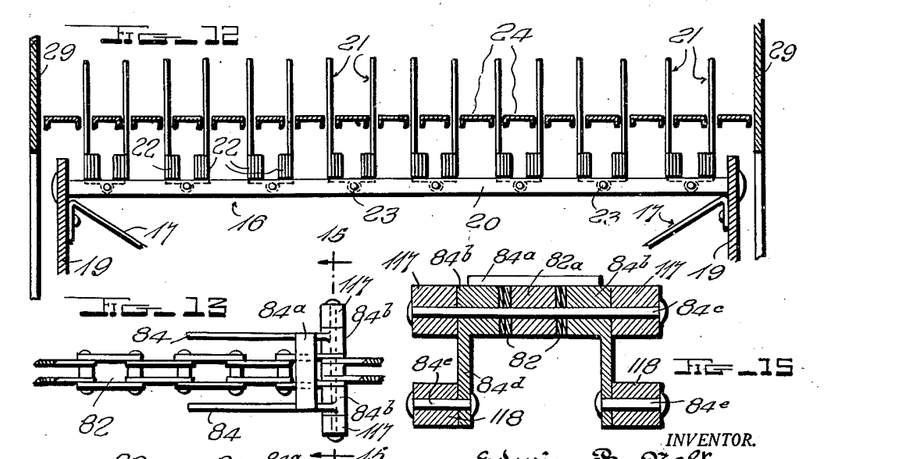
Fig. 12 is an enlarged transverse sectional view taken on line 12—12 of Fig. 11 illustrating the gathering members in elevation.
Fig. 13 is an enlarged horizontal plan view of a portion of one of the hay feeding conveyors employed in the feeder of my invention.
Fig. 15 is an enlarged transverse sectional view taken substantially on line 15—15 of Fig. 13.
Figure 14:
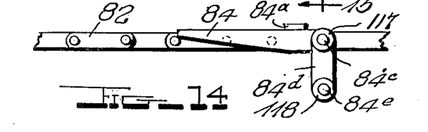
Fig. 14 is a side elevational view of the portion of the conveyor illustrated in Fig. 13.

Fig. 16 schematically illustrates single feeder fingers 84 and 85 propelled by the chains 82 and 83 but there are in fact pairs of feeder fingers carried by the conveyor chains at spaced intervals as set forth more clearly in Figs. 7, 9, 13 and 15. The pairs of feeder fingers located at spaced intervals along the conveyor chains are each symmetrically attached to the conveyors and are angularly movable on opposite sides of the chain conveyor. As shown in Figs. 13 and 14, the feeder fingers 84 are spaced to occupy positions on opposite sides of the chain shown at 82. The spaced fingers 84 are interconnected by a bridge portion 84a and terminate in hub portions 84b which are aligned on opposite sides of the coacting chain for the passage of a bolt member 84c therethrough. Bolt member 84c passes through the aligned hub portions 84b, through links of the chain 82 and through a central spacer 82a and also through cylindrical roller members 117 at opposite ends of the assembly as shown more clearly in Figs. 13 and 15. The feeder fingers also have integrally connected control members 84d extending normal from the hub portions 84b thereof. The control members each support stub bolts 84e on which are mounted roller members 118. Roller members 118 coact with roller members 117 in guiding the feeder fingers during the time period operation of the conveyor system.

Figure 5:
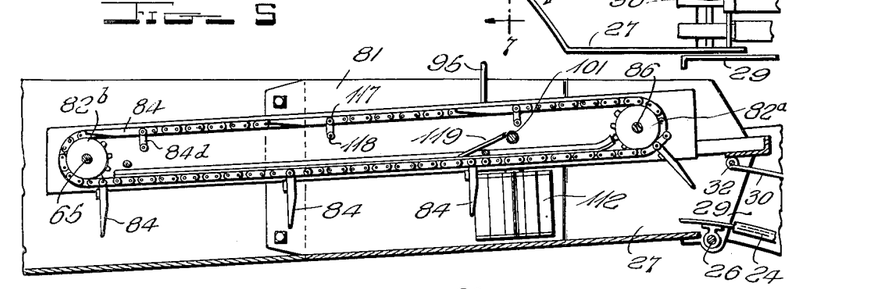
Fig. 5 is a longitudinal sectional view taken on line 5—5 of Fig. 4.
Figure 6:
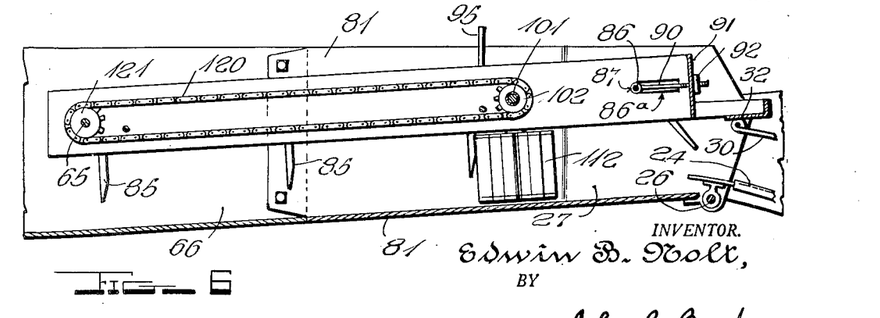
Fig. 6 is a central longitudinal sectional view taken substantially on line 6—6 of Fig. 4.
Figure 7:
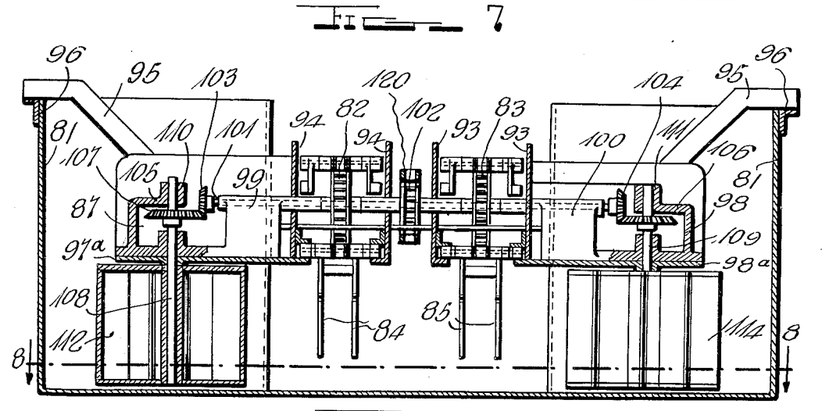
Fig. 7 is a transverse sectional view showing the hay feeding mechanism taken substantially on line 7—7 of Fig. 4, the view being enlarged to more clearly show the parts of the mechanism.
Figure 9:
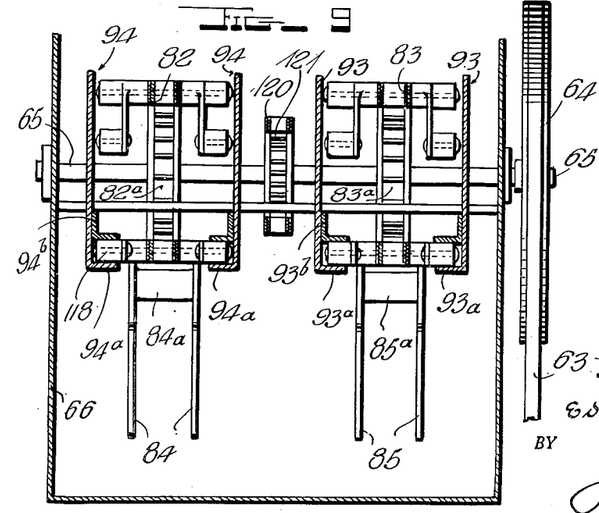
Fig. 9 is a transverse sectional view taken substantially on line 9—9 of Fig. 4, the view being enlarged to show the coacting parts of the conveying mechanism.
Figure 10:
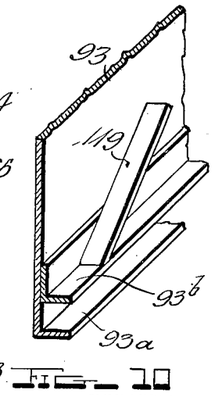
Fig. 10 is an enlarged fragmentary perspective view showing a portion of the guide means for guiding the hay feeding fingers of the conveyor mechanism of my invention.
Figure 11:
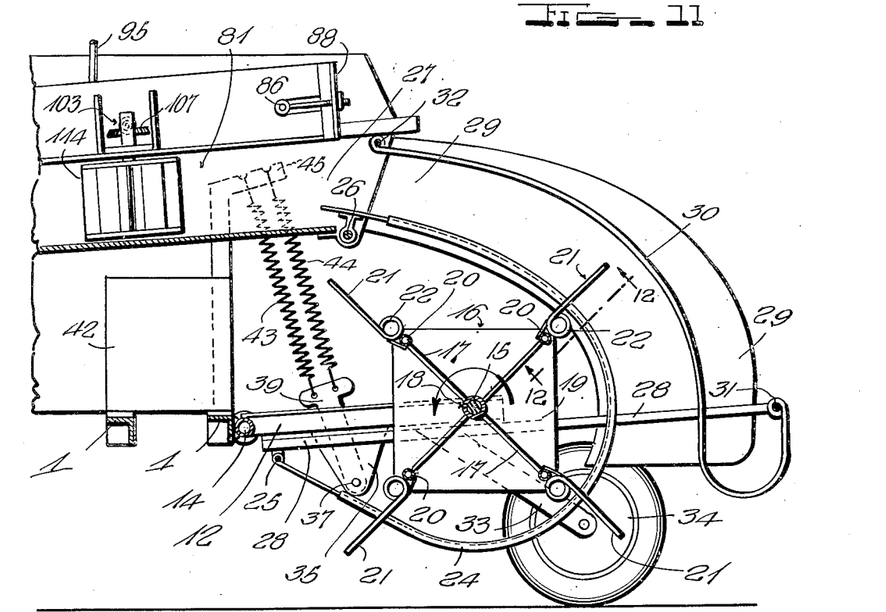
Fig. 11 shows an enlarged fragmentary portion of the hay gathering and feeding mechanism with parts illustrated in section showing the arrangement of elements for both the hay gatherer and the feeding mechanism and also showing the spring mechanism for maintaining the hay gatherer in elevated position.

As shown more clearly in Figs. 9 and 10, the longitudinally extending plates 93 and 94 each have inwardly directed rails 93a and 94a adjacent their lower marginal edges. Each of the plates 93 and 94 also carry longitudinally extending angle irons on the adjacent inner faces thereof as represented at 93b and 94b. Thus pairs of parallel rails are provided between which the roller members associated with the pairs of gathering fingers may move. As illustrated in Figs. 7 and 9, the pairs of roller members 117 and 118 are moved to positions in which the roller members are all confined between the rails 94a and 94b so that the feeder fingers 84 are maintained in a depending position as represented in Fig. 16 for advancing the hay through the trough-like portion 66 as represented in Fig. 16. The parallel rails extend the entire distance intermediate shafts 86 and 65 as shown in Fig. 5 so that the feeder fingers are maintained normal to the chains throughout this substantially downward inclined path of travel. However, as the sets of roller members 118 are released from the space between the faces of the parallel rails 94a and 94b the feeder fingers 84 assume a position illustrated in Fig. 5 and Fig. 16 in alignment with the upper portion of the conveyor chain 84 and return preparatory to a repeat operation as depicted in Figs. 5 and 16. The manner of operation of the feeder finger on each of the conveyors 82 and 83 is identical so that I have only explained the operation of one of the conveyor units. In order to prevent the feeder fingers from striking transverse shaft 101. I arrange an inclined member 119 on the inside surfaces of the plate members 93 and 94 to act as cams to gently raise the feeder fingers in the course of travel in the upper path of the chain. Thus the feeder fingers are prevented from striking the shaft 101 should the chain on which the feed fingers are mounted sag to an unreasonable extent due to excessive wear of the chain.

The sprocket wheel 102 is engaged by chain 120 which is driven from sprocket wheel 121 carried by driven shaft 65. Appropriate means such as an adjusting mechanism in the form of a yoke connected with the journals for shaft 101 similar to member 90 and screw threaded nut connection 92 are provided to tighten the sprocket chain 120 to insure adequate driving force and to eliminate undesirable sagging due to wear. A positive driving force is applied to each of the conveyor chains 82 and 83 and to the transverse shaft 101 for driving the said wheels 112 and 114 for moving the hay inwardly into the throat of the feeder through and along the feeder trough to the baling chamber of the baler.

Figure 17:
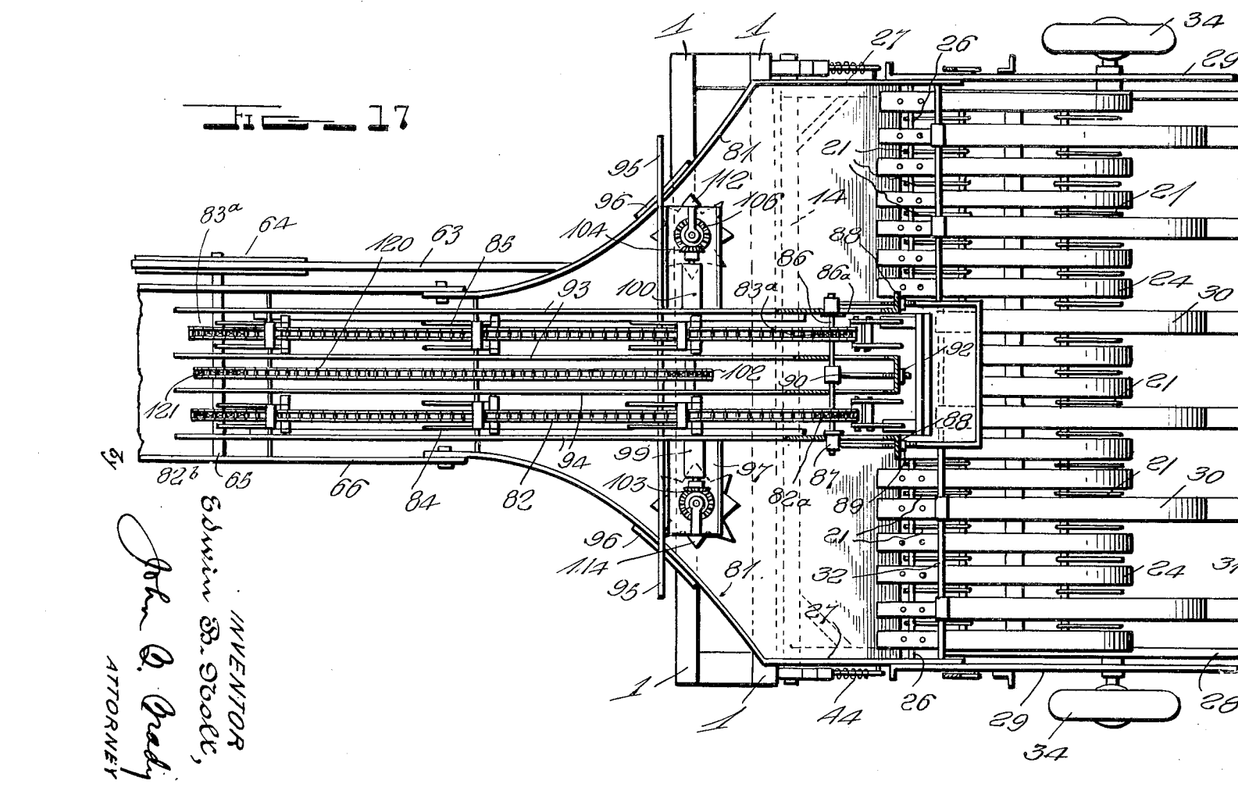
Fig. 17 is an enlarged top-plan view of the hay gathering and feeding mechanism of my invention.

Fig. 17 shows in top-plan view the coordination of the parts of the gatherer and the feed frame 29 and shiftable frame represented by angle members 52 and 53. It will be observed that the curved strip-like members 24 and 30 are so supported at the opposite ends thereof that they may undergo a displacement and deformation.

It will be observed that the parts of the gathering mechanism are all proportioned to interact conjointly and are synchronized in operation to insure uniform feeding of hay to the baling chamber as the baler advances through the field in performing the baling operation.

Throughout the specification wherever I have used the term "hay," I desire this to be understood as a general term inasmuch as the harvester of my invention is equally applicable for use with straw or other material to be baled. In using the term "gatherer" I intend to include all equipment generally known as "pick-up" balers which are now becoming so widely used in agriculture.

While I have described my invention in certain of its preferred embodiments, I realize that modifications may be made and I intend no limitations upon my invention other than may be imposed by the scope of the appended claims.

What I claim as new and desire to secure by Letters Patent of the United States, is as follows:

1. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure forwardly of the axis of said wheeled support, trough-like walls adjacent opposite ends of said rotatable gatherer extending from a position adjacent the bottom of the pivotally mounted frame structure to a position adjacent the top of said rotatable gatherer, a hay feeding trough mounted on said chassis adjacent the top of said gatherer, the said trough-like walls on said pivotally mounted frame structure extending immediately adjacent and parallel to the walls of said hay-feed trough operative to move in overlapping relationship with respect to said hay feeding trough when said pivotally mounted frame structure is elevated for moving the wheeled support thereof out of contact with the ground, and means for latching said pivotally mounted frame in a position maintaining the wheeled support thereof out of contact with the surface of the ground.

2. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure forwardly of the axis of said wheeled support, rows of radially extending gatherer fingers carried by said rotatable gatherer, a plurality of spaced substantially circular rows of guide members of band-like contour extending between the pivotally mounted frame of the wheeled support and the chassis on opposite sides of each of the rows of said gatherer fingers, trough-like walls at opposite ends of said rotatable gatherer extending from a position adjacent the bottom of the pivotally mounted frame structure to a position adjacent the top of said rotatable gatherer, a hay feeding trough mounted on said chassis adjacent the top of said rotatable gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled support thereof out of contact with the ground, and means for latching said pivotally mounted frame structure in position maintaining the wheeled support thereof out of contact with the surface of the ground.

3. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure forwardly of the axis of said wheeled support, rows of radially extending gatherer fingers carried by said rotatable gatherer, a plurality of substantially circular strip-like members spaced from each other with said gatherer fingers projectible between said strip-like members, said members being pivotally supported at one end on said chassis and at the other end on the pivotally mounted frame structure, trough-like walls at opposite ends of said rotatable gatherer extending from a position adjacent the bottom of the pivotally mounted frame structure to a position adjacent the top of said rotatable gatherer, a hay feeding trough mounted on said chassis adjacent the top of said rotatable gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled support thereof out of contact with the ground, and means for latching said pivotally mounted frame structure in a position maintaining the wheeled support thereof out of contact with the surface of the ground.

4. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure in a position intermediate the pivot of said frame structure and the axis of said wheeled support, trough-like walls at opposite sides of said rotatable gatherer extending from a position adjacent the bottom of the pivotally mounted frame structure to a position adjacent the top of said rotatable gatherer, a hay feeding trough mounted on said chassis adjacent the top of said gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled support thereof out of contact with the ground, link members pivotally connected with opposite sides of said pivotally mounted frame structure, bracket members mounted on said chassis, and spring means extending between said link members and said bracket members for counterbalancing said frame structure with respect to said chassis.

5. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure in a position intermediate the pivot of said frame structure and the axis of said wheeled support, trough-like walls at opposite sides of said rotatable gatherer extending from a position adjacent the bottom of the pivotally mounted frame structure to a position adjacent the top of said rotatable gatherer, a hay feeding trough mounted on said chassis adjacent the top of said gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled supported thereof out of contact with the ground, link members pivotally connected with opposite sides of said pivotally mounted frame structure, bracket members mounted on said chassis, spring means extending between said link members and said bracket members for counterbalancing said frame structure with respect to said chassis, and latch mechanism extending between said chassis and said pivotally mounted frame structure for latching said frame structure in an elevated position with respect to said chassis.

6. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure in a position intermediate the pivot of said frame structure and the axis of said wheeled support, trough-like walls at opposite sides of said rotatable gatherer extending from a position adjacent the bottom of the pivotally mounted frame structure to a position adjacent the top of said rotatable gatherer, a hay feeding trough mounted on said chassis adjacent the top of said gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled support thereof out of contact with the ground, link members pivotally connected with opposite sides of said pivotally mounted frame structure, bracket members projecting upwardly from said chassis, a spring extending between the link member and the bracket member at one side of said pivotally mounted frame structure, and a pair of spaced springs extending between the link member and the bracket member at the other side of said pivotally mounted frame structure for counterbalancing said frame structure with respect to said chassis.

7. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure in a position intermediate the pivot of said frame structure and the axis of said wheeled support, trough like walls at opposite sides of said rotatable gatherer extending from a position adjacent the bottom of the pivotally mounted frame structure to a position adjacent the top of said rotatable gatherer, a hay feeding trough mounted on said chassis adjacent the top of said gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled support thereof out of contact with the ground, link members pivotally connected with opposite sides of said pivotally mounted frame structure, bracket members projecting upwardly from said chassis, a coil spring extending between the link member and the bracket member at one side of said pivotally mounted frame structure, a pair of spaced coil springs extending between the link member and the bracket member at the other side of said pivotally mounted frame structure for counterbalancing said frame structure with respect to said chassis, and engageable and disengageable pivoted latch mechanism extending between said chassis and said pivotally mounted frame structure for latching said frame structure in an elevated position with respect to said chassis.

8. Hay gathering mechanism comprising in combination with a vehicle chassis, a frame structure pivotally mounted with respect to the chassis and having a wheeled support thereon normally engageable with the ground, a rotatable gatherer journaled in said pivotally mounted frame structure in a position intermediate the pivot of said frame structure and the axis of said wheeled support, trough-like walls at opposite sides of said rotatable gatherer extending from a position adjacent the bottom of the pivotally mounted frame structure to a position adjacent the top of said rotatable gatherer, a hay feeding trough mounted on said chassis adjacent the top of said gatherer, the said trough-like walls on said pivotally mounted frame structure extending immediately adjacent and parallel to the walls of said hay-feeding trough and operative to move in overlapping relationship with respect to said hay feeding trough when said pivotally mounted frame structure is elevated for moving the wheeled support thereof out of contact with the ground, link members pivotally connected with opposite sides of said pivotally mounted frame structure, one of said link members terminating in a substantially T-shaped head, bracket members projecting upwardly from said chassis, a coil spring extending between one of said link members, and the bracket member at one side of said pivotally mounted frame structure, a pair of spacially related substantially parallel extending coil springs connected between remote positions of the T-shaped head of the other of said link members and the bracket member at the other side of said pivotally mounted frame structure for counterbalancing said frame structure with respect to said chassis, and means for latching said frame structure in an elevated position with respect to said chassis.

EDWIN B. NOLT.

REFERENCES CITED

The following references are of record in the file of this patent:

UNITED STATES PATENTS

| Number | Name | Date |
|---|---|---|
| Re. 21,571 | Innes | Sept. 17, 1940 |
| 20,772 | Benton et al. | July 6, 1858 |
| 238,849 | Burson | Mar. 15, 1881 |
| 259,427 | Sample | June 13, 1882 |
| 1,680,888 | Kluck | Aug. 14, 1928 |
| 1,815,327 | Raney et al. | July 21, 1931 |
| 1,893,506 | Oppenheim | Jan. 10, 1933 |
| 2,335,764 | Innes | Nov. 30, 1943 |
| 2,378,107 | Russell | June 12, 1945 |